INVENTORS:
HOWARD L. CROSWHITE
LAWRENCE D. BURCZ
RICHARD L. LEONARD
BY: *[signatures]*
ATTORNEYS.

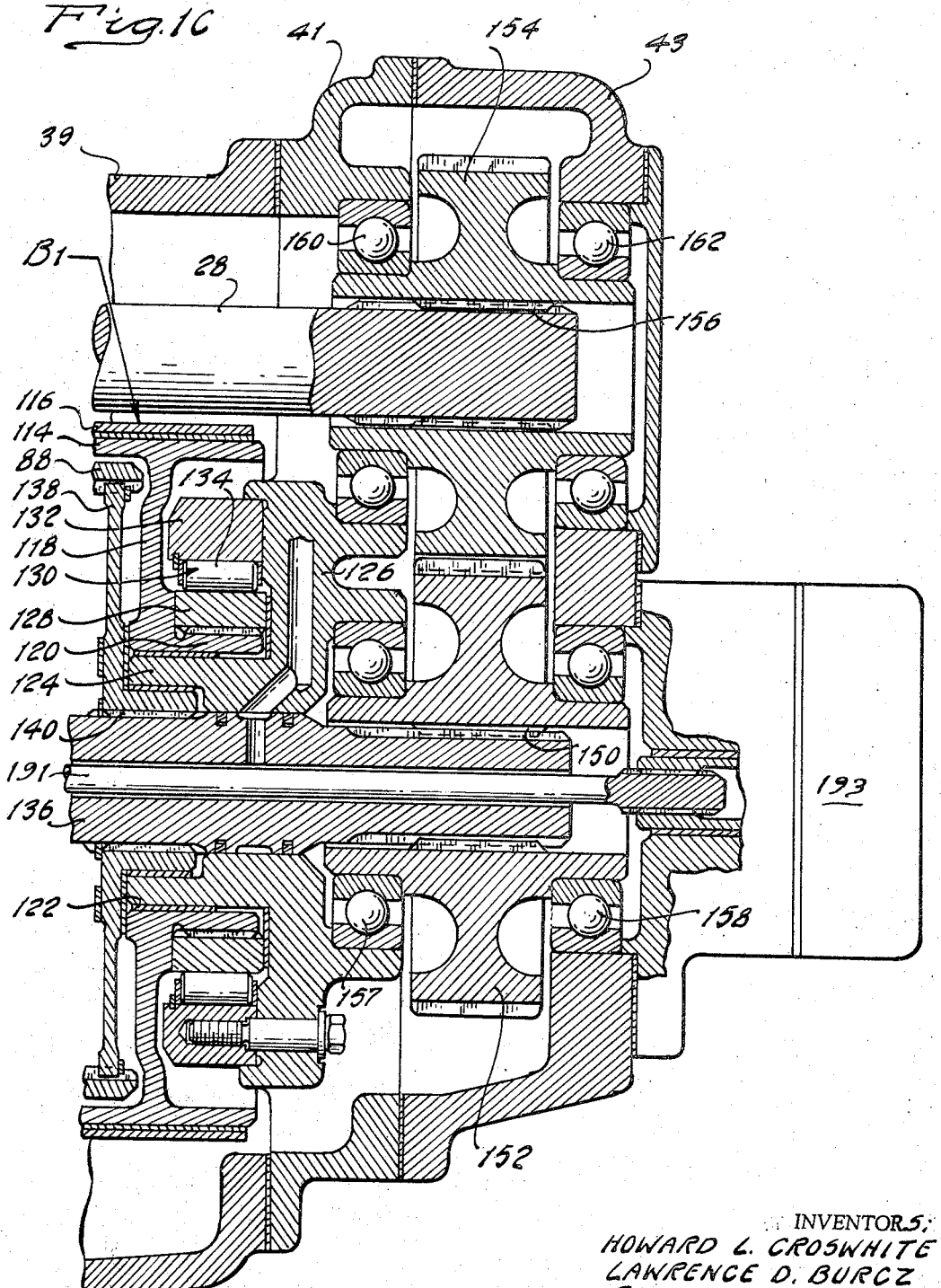

Fig. 4

| OPERATION | RATIO | C1 | C2 | C3 | C4 | B1 | B2 | O.W.C.1 | O.W.C.1 | O.W.C.2 |
|---|---|---|---|---|---|---|---|---|---|---|
| REVERSE | 1.570 | O | E | E | O | E | O | O | | O |
| NEUTRAL | | O | O | O | O | O | O | O | | O |
| LOW | 1.500 | E | O | O | O | B | O | E | | O |
| INTERMEDIATE | 1.194 | E | E | O | O | O | B | O | | E |
| DIRECT | 1.000 | E | E | E | O | O | O | O | | O |
| LOCK-UP | 1.000 | E | E | E | E | O | O | O | | O |

O = OFF
E = ENGAGED
B = COAST BRAKING ONLY

INVENTORS:
HOWARD L. CROSWHITE
LAWRENCE D. BURCZ
RICHARD L. LEONARD
BY: John A. Faulkner
and Daniel J. Harrington ATTORNEYS.

United States Patent Office 3,349,641
Patented Oct. 31, 1967

3,349,641
MULTIPLE SPEED RATIO POWER TRANSMISSION MECHANISM WITH CLOSE RATIOS
Howard L. Croswhite, Livonia, Lawrence D. Burcz, Detroit, and Richard L. Leonard, Farmington, Mich., assignors to Ford Motor Company, Dearborn, Mich., a corporation of Delaware
Filed Sept. 7, 1965, Ser. No. 485,452
4 Claims. (Cl. 74—763)

ABSTRACT OF THE DISCLOSURE

The specification describes a multiple ratio power transmission mechanism having two planetary gear units. The mechanism is capable of establishing closely spaced speed ratios to facilitate upshifting and downshifting between the ratios to provide optimum performance at high vehicle speeds. It is adapted especially for use in vehicles having an operating performance zone within a relatively narrow speed range.

My invention relates generally to power transmission mechanisms capable of being used in an automotive vehicle driveline. It relates more particularly to a multiple speed ratio power transmission system that is characterized by evenly stepped speed ratios, each ratio being only slightly different in value than the next adjacent ratio in the speed ratio shift pattern.

In designing automotive vehicle power transmission systems, it is common practice to employ multiple speed ratio gearing having input elements that are connected drivably by means of selectively engageable clutch mechanisms to a turbine member of a hydrokinetic torque converter unit. The impeller member of the torque converter unit is connected drivably to the crankshaft of an internal combustion engine. Since the vehicle engine speed experienced in normal driveline systems of this type varies considerably during operation, it is desirable to provide as many speed ratios as possible in the gearing and to select ratios that differ appreciably so that the engine may be operated at a speed that is somewhat close to the speed at which maximum engine torque is available. In this way, maximum vehicle accelerating torque can be obtained throughout a relatively wide range of vehicle engine speeds during the vehicle acceleration period.

The improved transmission system of my invention is adapted particularly for use in special purpose vehicles such as racing vehicles wherein the maximum performance operating zone occurs within a relatively narrow range of vehicle road speeds. Unlike conventional passenger vehicle drivelines wherein satisfactory performance is desired at each stage of the acceleration period with various engine speeds and road load conditions, the drivelines for racing vehicles usually require maximum performance only when the engine operates at speeds between the maximum speed and the cruising speed. It is necessary in such drivelines, however, for the vehicle operator to shift ratios, notwithstanding the narrower speed range over which the engine is required to operate, in order to achieve optimum performance at racing speeds. The adverse influence such ratios may have on the vehicle performance at low speeds is not usually a significant design factor.

It is an object of my invention to provide a planetary gear system for use in a driveline of the type above set forth wherein the ratios that may be obtained are closely stepped, one with respect to the other, and wherein ratio shifts may be obtained in a simplified fashion.

It is a further object of my invention to provide a planetray gear system having closely stepped speed ratios and a hydrokinetic torque converter situated between the torque source, such as an internal combustion engine, and power input elements of the gearing.

It is a further object of my invention to provide a transmission system of the type set forth in the preceding objects wherein selectively engageable friction clutch means will be caused to establish a mechanical torque delivery path between the engine and the power input elements, thus bypassing the hydrokinetic converter under certain steady-state driving conditions.

It is a further object of my invention to provide multiple speed ratio gearing of the type above set forth wherein speed ratio changes can be made by engaging or disengaging a single friction torque establishing device in the form of a clutch or brake, thus eliminating the need for synchronizing the engagement and disengagement of two such devices during a speed ratio change.

It is a further object of my invention to provide a planetary gear system of the type above set forth wherein the speeds of rotation of the pinions of the planetary gearing are of a reduced magnitude.

Further objects and features of my invention will become apparent from the following description and from the accompanying drawings, wherein:

FIGURES 1A, 1B and 1C show in cross-sectional form an assembly view of one embodiment of my invention;

FIGURE 4 is a chart that summarizes the engagement and release pattern of the clutches and brakes of the FIGURE 2 embodiment of my invention.

Figure 1A:
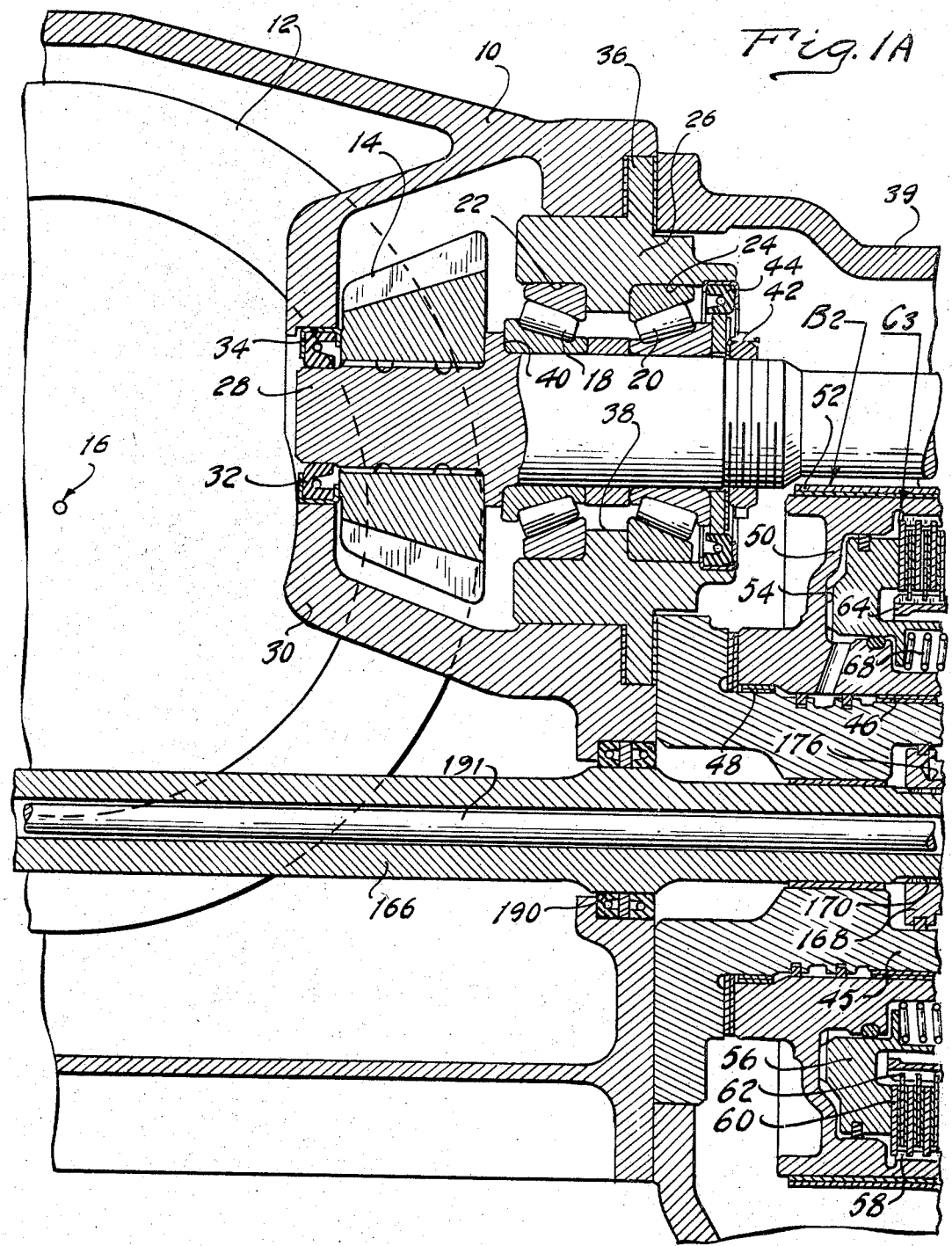
Figure 1B:
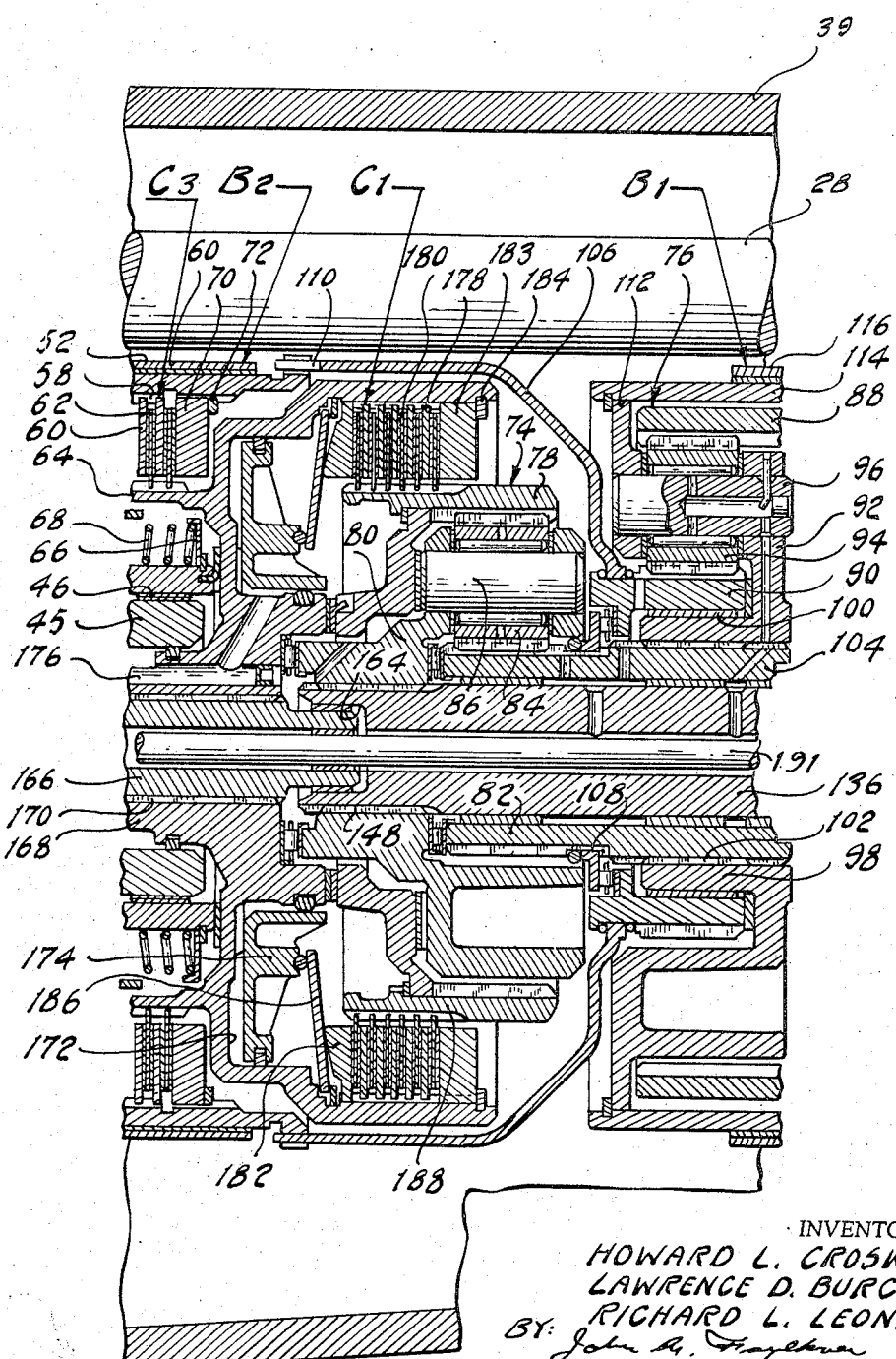

In FIGURES 1A, 1B and 1C, there is shown a transaxle arrangement of my invention. It is capable of transferring power directly from the crankshaft of an internal combustion engine to each of two axle shafts situated transversely with respect to the axis of rotation of the crankshaft. Numeral 10 in FIGURE 1A designates a portion of the housing which may be connected by bolts or by other suitable fastening means to the engine block of the vehicle engine. It encloses a differential gear mechanism comprising a ring gear 12, a power output pinion 14, and a pair of axle shafts (not shown) which are situated for rotation about a common transverse axis 16. The differential assembly comprises a carrier with differential pinions that mesh with differential side gears. Each side gear is connected to a separate axle shaft. The ring gear is connected directly to the differential carrier. Such differential carrier arrangements are well known in the art, and for this reason the assembly is not shown in detail.

The pinion 14 is journaled for rotation by means of a pair of tapered roller bearings 18 and 20. These are situated within bearing openings 22 and 24 formed in a transverse bearing support wall 26. The pinion 14 is splined to a power output shaft 28 which is received through the inner races for the bearings 18 and 20. The pinion 14 is enclosed by a closure 30 of the housing portion 10. A fluid seal 32 received with a bearing opening 34 rotatably supports one end of the shaft 28.

The bearing support wall 26 is secured at its periphery 36 to the housing portion 10 by means of bolts, not shown.

Wall 26 is formed with a reaction shoulder 38 which engages the outer races for the bearings 18 and 20. The inner race for bearing 18 ingages a reaction shoulder 40 formed on shaft 28. A clamping nut 42 threadably received on shaft 28 is adapted to exert an axial pre-load on the inner race for bearing 20, thereby preloading both bearings 18 and 20. Numeral 44 designates a fluid seal which isolates the interior of the main transmission housing.

Numeral 39 designates the main transmission housing portion. Secured to one end of the housing portion 39 is a bearing adapter ring 41. A closure member 43 in turn is bolted to the adapter 41. The other end of housing portion 39 is secured to the wall 26.

A sleeve shaft extension 45 is formed on wall 26. Journaled on the extension by means of bushings 46 and 48 is a clutch and brake drum 50. A brake band 52, which surrounds the drum 50, may be applied and released by means of a fluid pressure operated servo in known fashion to control the motion of the drum 50.

An annular cylinder 54 is formed in the drum 50, and an annular piston 56 cooperates with the cylinder 54 to define a fluid pressure working chamber. The inner periphery of drum 50 is splined at 58 so that it can carry externally splined clutch discs 60. These are situated in interdigital relationship with respect to internally splined clutch discs 62 carried by an externally splined clutch element 64.

A spring seat 66 is held on the hub of drum 50 by means of a snap ring. A piston return spring 68 is situated between the piston 56 and the seat 66, thereby tending to urge the piston 56 to a clutch releasing position.

A clutch pressure disc reaction ring 70 carried by the internally splined drum 50 adjacent the clutch discs is held axially fast by means of a snap ring 72.

Shown in FIGURE 1B is a pair of simple planetary gear units 74 and 76. Gear unit 74 includes a ring gear 78, a carrier 80, a sun gear 82, and planet pinions 84. Pinion shafts 86, which form a part of the carrier 80, journal the pinions 84, the latter meshing with the ring gear 78 and sun gear 82.

Gear unit 76 includes a ring gear 88, a sun gear 90, a carrier 92, and planet pinions 94. Pinion shafts 96, which form a part of the carrier 92, journal the pinions 94, the latter meshing with ring gear 88 and sun gear 90. Carrier 92 includes a hub 98 upon which the sun gear 90 is journaled, a bushing 100 being provided for this purpose.

Hub 98 is splined at 102 to a sleeve extension 104 of sun gear 82.

A drive shell 106 surrounds gear unit 74. It includes a splined central opening which permits a driving connection with sun gear 90. This connection is shown at 108. The radially outward margin of the drive shell 106 is keyed as shown at 110 to the drum 50.

Carrier 92 is splined at its outer periphery 112 to a brake drum 114. A friction brake band 116 encircles drum 114. It may be applied and released selectively by means of a fluid pressure servo in the usual fashion.

Drum 114 includes a supporting web 118 having a hub 120 which is journaled by means of bushing 122 upon a stationary sleeve support 124. The support 124 forms a part of wall 126.

Hub 120 is splined to the inner race 128 of an overrunning brake 130. This brake includes an outer race 132 secured in a fixed fashion to the wall 126. Overrunning brake elements in the form of rollers 134 are situated between the races 128 and 132. The race 132 can be cammed to permit camming action with the rollers 134, thereby causing a one-way braking action of the drum 114.

Ring gear 88 is connected drivably to a driven shaft 136 by means of a torque transfer member 138. This member is splined at 140 to the shaft 136. Carrier 80 is splined at 148 to the shaft 136.

The right-hand end of shaft 136 is splined at 150 to a final drive gear 152 which meshes with a second final drive gear 154. Shaft 28 is splined at 156 to the gear 154.

Gear 152 is journaled by spaced bearings 157 and 158. Bearing 157 is fixed within a bearing opening formed in the wall 126. Bearing 158 is fixed within a bearing opening formed in the closure member 43. Corresponding bearings 160 and 162 journal gear 154, bearing 160 being received within a bearing opening formed in wall 126 and bearing 162 being received within a bearing opening formed in the closure member 43.

Shaft 136 is formed with a pilot opening at the left-hand end thereof as shown at 164. The right-hand end of power input shaft 166 is journaled within the opening 164. A clutch drum 168 is splined at 170 to the shaft 166. Drum 168 is formed with an annular cylinder 172 within which is positioned an annular piston 174. Piston 174 and the cylinder 172 cooperate to define a pressure chamber which is in fluid communication with a fluid pressure supply passage 176.

The clutch element 64 is formed integrally with drum 168. The outer periphery of drum 168 is splined internally to permit a driving connection with externally splined clutch discs 178. These are situated in interdigital relationship with respect to internally splined clutch discs 180. A clutch pressure plate 182 is disposed on one side of the assembly of discs 178 and 180 and a reaction ring 183 is situated on the opposite side thereof. Ring 183 is splined to the internal splines of drum 168 and is held axially fast by a snap ring 184.

A Belleville spring 186 is situated within the drum 168, and its outer periphery is anchored against the drum. The inner periphery of spring 186 is engaged by piston 174. A point on the spring intermediate the inner and outer peripheries thereof engages the pressure plate 182.

Internally splined discs 180 are carried by an externally splined portion 188 of ring gear 78.

Power input shaft 166 extends through an opening 190 in the wall 26. It extends forwardly and it may be conneced to the vehicle engine crankshaft, not shown.

During operation the clutch shown in part at 178 and 180 is engaged under each of the forward driving speed ratio conditions. It merely is necessary to engage the clutch shown in part at 178 and 180 (hereinafter referred to as clutch C1) to establish the lowest speed ratio since the overrunning brake shown in part at 134 is effective to establish a torque reaction point. Engine torque is delivered under these conditions through shaft 166, through the drum 168, through clutch C1, and through the front planetary gear unit 74 to the shaft 136. Torque is delivered through clutch C1 to the ring gear 78 and the sun gear 82 acts as a reaction member since it is anchored by the overrunning brake shown in part at 134.

Shaft 136 drives gear 152 which meshes with gear 154. Torque then is delivered from gear 154 to power output shaft 28 and, hence, to the differential drive pinion 14.

If coast braking is desired, the brake band 116 can be applied, thereby complementing the action of overrunning brake shown in part at 134. This enables the carrier 92 to function as a reaction point in the gear system regardless of the direction of torque delivery.

A speed ratio change to the intermediate speed ratio can be accomplished by engaging brake band 52. This anchors sun gear 90, the latter acting as a reaction point. Engine torque then is delivered through shaft 166, through the engaged clutch C1, through the front planetary gear unit 74, and through shaft 136 to the ring gear 88. Due to the resistance that shaft 136 offers to rotation, sun gear 82 experiences a torque reaction. The sun gear is coupled directly to the carrier 92 which tends to rotate in a direction opposite to the direction of rotation of shaft 166 due to the torque reaction on sun gear 82. This torque reaction, however, is insufficient to overcome the oppositely directed driving torque applied to the ring gear 88. Thus, the carrier 92 tends to be driven in the direction of rotation of the shaft 166. The sun gear 82 also is driven in the direction of rotation of shaft 166, and the effective speed ratio through the gearing is increased although it still is less than unity.

To effect a speed ration change from the intermediate speed ratio to the high speed ratio, both brakes are released and both clutches C1 and C2 are appied. Thus, the ring gear 78 becomes locked to the sun gear 82 and the transmission gear elements rotate in unison.

To obtain reverse drive, clutch C3 is applied, clutch C1 is released, brake band 52 is released, and brake band 116 is applied. Engine torque then is delivered from shaft 166 through clutch C3 and through drive shell 106 to the sun gear 90. Since the carrier 92 is anchored by the brake band 116, ring gear 88 and shaft 136 are driven in a reverse direction.

An engine powered quill-shaft 191 extends through power input shaft 166. It is drivably connected to a positive displacement pump 193 which serves as a pressure source for the clutch and brake servos.

Figure 2:
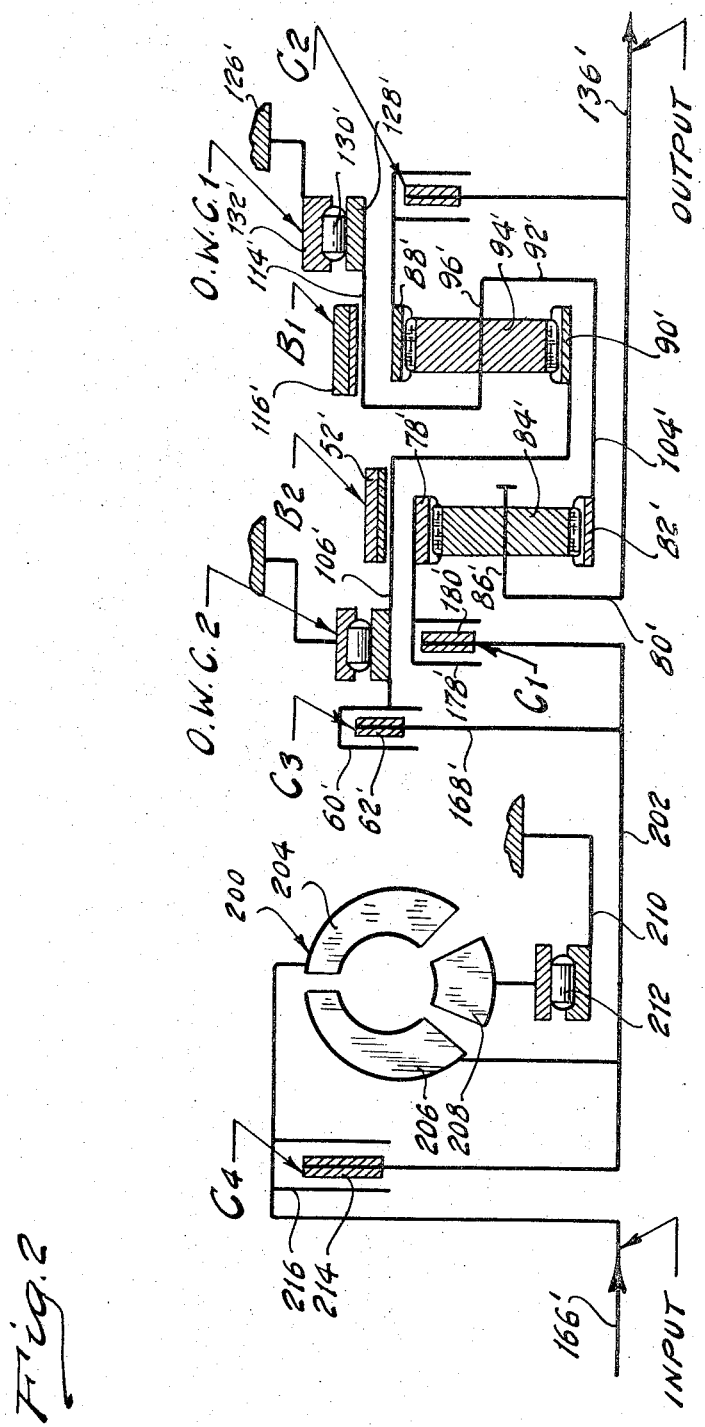
FIGURE 2 shows schematically an assembly view of an alternate embodiment of my invention.

In FIGURE 2 I have illustrated in schematic form an alternate embodiment of my invention. It employs two simple planetary gear units in a way that resembles the gearing arrangement of the embodiment of FIGURES 1A, 1B and 1C. The FIGURE 2 embodiment, however, is a so-called "in line" version with the axle shaft for the vehicle traction wheels arranged in alignment with the axis of rotation of the engine crankshaft.

In FIGURE 2 the driven shaft is identified by reference character 136' and the driving shaft is identified by reference character 166'. There is no counterpart in the embodiment of FIGURE 2 for the countershaft 28 and the right angle drive gearing shown in FIGURE 1A.

In the embodiment of FIGURE 2 the elements that find a counterpart in the embodiment of FIGURES 1A, 1B and 1C have been identified by the same reference characters that identify the elements of FIGURES 1A, 1B and 1C, although prime notations have been added. The mode of operation of the gearing arrangement of FIGURE 2 is similar to the mode of operation of the previously described gearing arrangement. In FIGURE 2, however, the power input shaft 166' is coupled to the power input portion of the clutch C1 by means of a hydrokinetic torque converter 200 and a turbine shaft 202. Converter 200 includes an engine driven, bladed impeller 204, a bladed turbine 206, and a bladed stator 208. The impeller 204, turbine 206, and the stator 208 are arranged in toroidal fluid flow relationship in a common torus circuit in the usual fashion. Turbine 206 is connected drivably to the shaft 202.

Stator 208 is mounted upon a stationary sleeve shaft 210. An overrunning brake 212 anchors the stator 208 against rotation in a direction opposite to the direction of rotation of the engine, although freewheeling motion in the other direction is permitted.

In the embodiment of FIGURE 2, I have employed a lockup clutch identified by the symbol C4. It includes a friction element 214 connected to turbine shaft 202 and one or more companion friction elements 216 carried by the impeller 204. If high efficiency cruising operation is desired, the clutch C4 can be engaged, thereby bypassing the torque converter 200. This connects directly the engine driven shaft 166' with the turbine shaft 202.

Shown also in the embodiment of FIGURE 2 is an auxiliary friction clutch C2 which establishes a selective driving connection between ring gear 88' and shaft 136'. Also provided in the FIGURE 2 embodiment is a second overrunning brake identified by the symbol OWC2. This complements the action of the brake band 52'. The presence of the clutch C2 and the overrunning brake OWC2 permits a nonsynchronous pickup shift between the intermediate speed ratio and the high speed ratio.

During operation in the intermediate speed ratio, clutch C2 is engaged. Sun gear 90' is capable of acting as a reaction member since it is held against rotation by overrunning brake OWC2. During operation in the low speed ratio, however, the clutch C2 is disengaged. Thus, the overrunning brake OWC2 is nonfunctional. By employing clutch C2 and the overrunning brake OWC2 in this fashion, it is possible to utilize the overrunning brake OWC2 as a reaction member during intermediate speed ratio operation. It is not necessary to provide an overrunning brake releasing device for overrunning brake OWC2, however, since the clutch C2 is disengaged during low speed ratio operation, thereby avoiding any tendency for the sun gear 90' to be driven.

Figure 3:
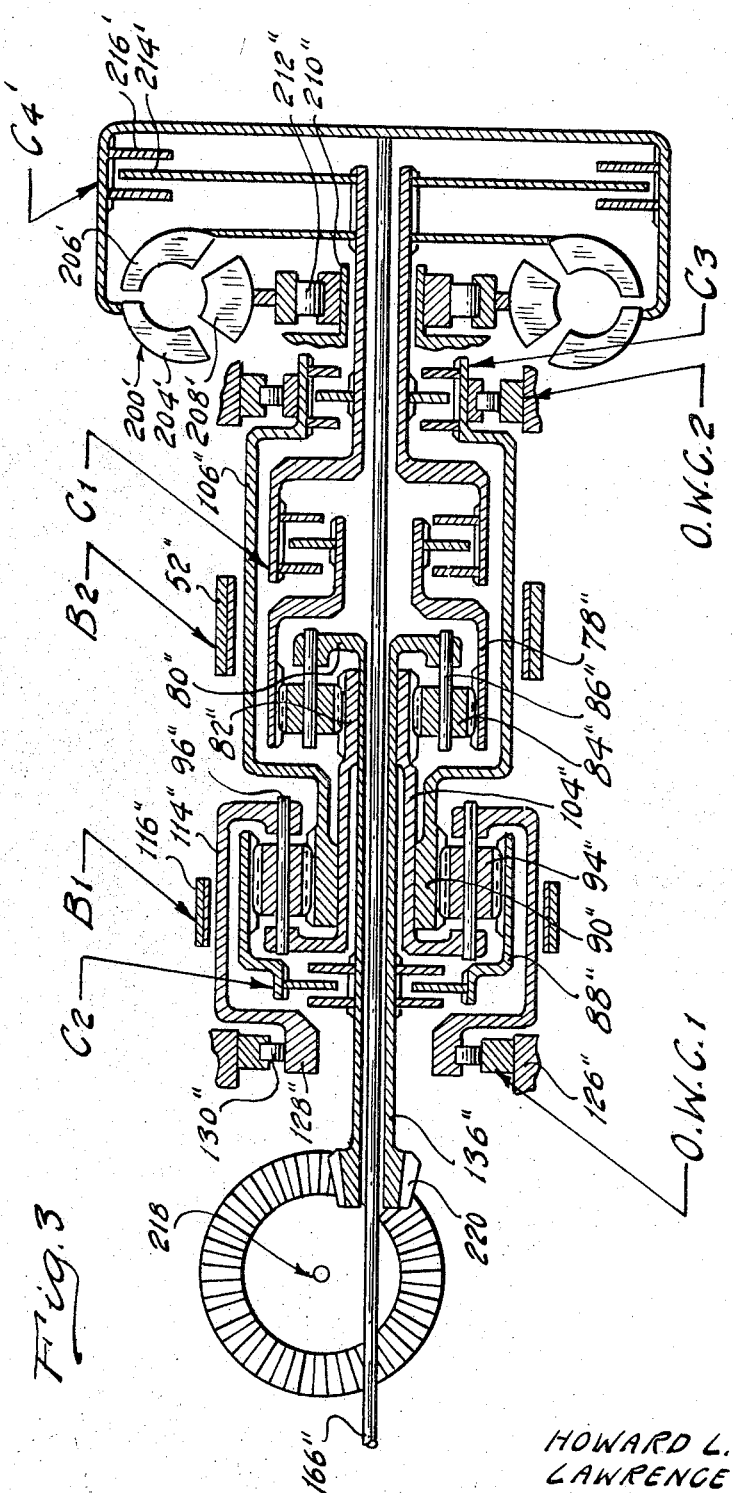
FIGURE 3 shows in schematic form a third embodiment of my invention.

In FIGURE 3, I have shown a cross-drive arrangement for the transmission structure shown in FIGURE 2. The FIGURE 3 embodiment includes all the elements shown in FIGURE 2, and the elements have been identified by similar reference characters, although double prime notations have been added in FIGURE 3.

In FIGURE 3 the power input shaft shown at 166" extends through the transmission assembly in concentric fashion and is connected drivably to the impeller 204" for the torque converter 200'. By employing an arrangement of the type shown in FIGURE 3, it is possible to locate the power input element of the transmission system relatively closely to the engine with the axle shaft situated transversely in a location between the transmission system and the engine. The axis of the axle shaft for the embodiment of FIGURE 3 is shown at 218. The power output pinion for the cross-drive used in the embodiment of FIGURE 3 is identified by reference character 220.

In FIGURE 4, I have illustrated the clutch and brake engagement and release pattern for the embodiment of FIGURE 2. Band 52' has been identified by the symbol B2 and the brake band 116' has been identified by the symbol B1.

I have stated in FIGURE 4 numerical speed ratios for a typical gearing arrangement. The magnitudes of the ratios are relatively close to each other. This characteristic is peculiar to the gearing arrangement of my invention. The ratio steps are evenly spaced, although they are spaced relatively close to each other. This characteristic adapts my invention particularly for use in the driveline of a racing vehicle where frequent changes in torque ratio are required while the vehicle engine operates at high speed. Inertia forces due to changes in the speeds of rotation of the rotary elements of the driveline are reduced by reason of the closely stepped ratios that are obtained.

Having thus described preferred forms of our invention, what we claim and desire to secure by U.S. Letters Patent is:

1. In a driveline for an engine powered vehicle, a pair of simple planetary gear units adapted to establish a plurality of torque delivery paths between a driving member and a driven member, each gear unit comprising a ring gear, a sun gear, a carrier, and planet pinions mounted upon said carrier in meshing engagement with the associated sun and ring gears, means for establishing a torque transmitting connection between the engine and the ring gear of a first planetary gear unit, means for establishing a torque transmitting connection between the carrier of said first gear unit and said driven member, the sun gear of said first gear unit being connected to the carrier of the other gear unit, reaction brake means for anchoring the carrier of said second gear unit, means for transferring driving torque from the ring gear of said other gear unit to said driven member, means for anchoring the sun gear of said second gear unit to provide a torque reaction point during intermediate speed ratio operation, and means for clutching two elements of said gear units together to establish a high speed ratio driving condition, said reaction brake means comprising an overrunning coupling adapted to inhibit rotation of the carrier for said second gear unit in one direction while accommodating freewheeling motion thereof in the opposite direction thereby permitting a nonsynchronous pickup shift from the low speed ratio to the intermediate speed ratio when said sun gear anchoring means is applied, said sun gear anchoring means comprising an overrunning coupling capable of accommodating torque reaction in one direction but permitting freewheeling motion of the sun gear of said second gear unit in the opposite direction thereby permitting a nonsynchronous upshift from the intermediate speed ratio to the high speed ratio as both clutches are applied.

2. A torque delivery driveline comprising a pair of simple planetary gear units adapted to establish a plurality of torque delivery paths between a driving member and a driven member, each gear unit comprising a ring gear, a sun gear, a carrier, and planet pinions rotatably mounted upon said crarier in meshing engagement with the associated sun and ring gears, the carrier for said first gear unit being connected to said driven member, means for connecting the ring gear of said second gear unit to said driven member, the sun gear of said first gear unit being connected to the carrier of said second gear unit, means for braking the carrier of said second gear unit to provide a torque reaction point during low speed ratio operation, other brake means for anchoring the sun gear of said second gear unit to establish a reaction point during intermediate speed ratio operation, selectively engageable clutch means for connecting the ring gear of said first gear unit to said driving member, second selectively engageable clutch means adapted to be engaged and released selectively for establishing with said first clutch means a connection between two elements of said gear units thereby causing said elements to rotate in unison as both brake means are released, said carrier braking means comprising an overrunning coupling adapted to inhibit rotation of the carrier for said second gear unit in one direction while accommodating freewheeling motion thereof in the opposite direction thereby permitting a nonsynchronous pickup shift from the low speed ratio to the intermediate speed ratio when said other brake means is applied, said other brake means comprising an overrunning coupling capable of accommodating torque reaction in one direction but permitting freewheeling motion of the sun gear of said second gear unit in the opposite direction thereby permitting a nonsynchronous upshift from the intermediate speed ratio to the high speed ratio as both clutches are applied.

3. In a driveline for an engine powered vehicle, a pair of simple planetary gear units adapted to establish a plurality of torque delivery paths between a driving member and a driven member, each gear unit comprising a ring gear, a sun gear, a carrier, and planet pinions mounted upon said carrier in meshing engagement with the associated sun and ring gears, means for establishing a torque transmitting connection between the engine and the ring gear of a first planetary gear unit, means for establishing a torque transmitting connection between the carrier of said first gear unit and said driven member, the sun gear of the first gear unit being connected to the carrier of the second gear unit, reaction brake means for anchoring the carrier of said second gear unit, means for transferring driving torque from the ring gear of said second gear unit to said driven member, means for anchoring the sun gear of said second gear unit to provide a torque reaction point during intermediate speed ratio operation, and means for clutching two elements of said gear units together to establish a high speed ratio driving condition, a hydrokinetic unit comprising a bladed impeller and a bladed turbine situated in toroidal fluid flow relationship, said converter defining a hydrokinetic torque delivery path between said driving member and said gear units, and selectively engageable lockup clutch means for establishing a bypass torque delivery path around said torque converter unit thereby establishing a fully mechanical torque delivery system with said gear units, said reaction brake means comprising an overrunning coupling adapted to inhibit rotation of the carrier for said second gear unit in one direction while accommodating freewheeling motion thereof in the opposite direction thereby permitting a nonsynchronous pickup shift from the low speed ratio to the intermediate speed ratio when said sun gear anchoring means is applied, said sun gear anchoring means comprising an overrunning coupling capable of accommodating torque reaction in one direction but permitting freewheeling motion of the sun gear of said second gear unit in the opposite direction thereby permitting a nonsynchronous upshift from the intermediate speed ratio to the high speed ratio as both clutches are applied.

4. A torque delivery driveline comprising a pair of simple planetary gear units adapted to establish a plurality of torque delivery paths between a driving member and a driven member, each gear unit comprising a ring gear, a sun gear, a carrier, and planet pinions rotatably mounted upon said carrier in meshing engagement with the associated sun and ring gears, the carrier for said first gear unit being connected to said driven member, means for connecting the ring gear of said second gear unit to said driven member, the sun gear of said first gear unit being connected to the carrier of said second gear unit, means for braking the carrier of said second gear unit to provide a torque reaction point during low speed ratio operation, other brake means for anchoring the sun gear of said second gear unit to establish a reaction point during intermediate speed ratio operation, selectively engageable clutch means for connecting the ring gear of said first gear unit to said driving member, second selectively engageable clutch means adapted to be engaged and released selectively for establishing with said first clutch means a connection between two elements of said gear units thereby causing said elements to rotate in unison as both brake means are released, a hydrokinetic unit comprising a bladed impeller and a bladed turbine situated in toroidal fluid flow relationship, said converter defining a hydrokinetic torque delivery path between said driving member and said gear units, and selectively engageable lockup clutch means for establishing a bypass torque delivery path around said torque converter unit thereby establishing a fully mechanical torque delivery system with said gear units, said carrier braking means comprising an overrunning coupling adapted to inhibit rotaton of the carrier for said second gear unit in one direction while accommodating freewheeling motion thereof in the opposite direction thereby permitting a nonsynchronous pickup shift from the low speed ratio to the intermediate speed ratio when said other brake means is applied, said other brake means comprising an overrunning coupling capable of accommodating torque reaction in one direction but permitting freewheeling motion of the sun gear of said second gear unit in the opposite direction thereby permitting a nonsynchronous upshift from the intermediate speed ratio to the high speed ratio as both clutches are applied.

References Cited

UNITED STATES PATENTS

| 2,645,137 | 7/1953 | Roche | 74—763 X |
| 2,912,884 | 11/1959 | Christenson et al. | 74—763 X |
| 3,095,764 | 7/1963 | Peras | 74—763 |
| 3,292,458 | 12/1966 | Livezey | 74—763 |
| 3,296,894 | 1/1967 | Moan | 74—763 X |

DONLEY J. STOCKING, *Primary Examiner.*

THOMAS C. PERRY, *Examiner.*